July 30, 1957 R. CLEVY ET AL 2,801,237
CONTINUOUS PROCESS FOR THE ESTERIFICATION OF
CELLULOSE IN HOMOGENEOUS PHASE
Filed Jan. 13, 1953
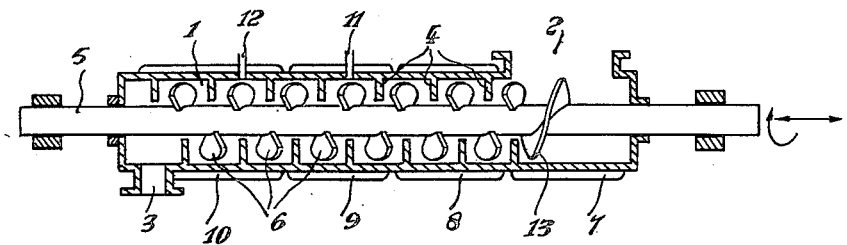
Inventors
Roland Clevy
Jean Robin
by [signature] atty

2,801,237
CONTINUOUS PROCESS FOR THE ESTERIFICATION OF CELLULOSE IN HOMOGENEOUS PHASE

Roland Clévy, Le Peage-de-Roussillon (Isere), and Jean Robin, Roussillon (Isere), France, assignors to Societe "Rhodiaceta," Paris, France, a body corporate of France Application January 13, 1953, Serial No. 330,968

Claims priority, application France October 15, 1952

2 Claims. (Cl. 260—227)

Diverse processes and apparatus for effecting the continuous esterification of cellulose in homogeneous phase, that is to say in the presence of solvents in which the resulting ester dissolves, have already been described.

Among these processes there may be mentioned as examples:

The process in which the reaction mass goes through an apparatus where it is successively stirred by stirrers having forms and dimensions adapted to the consistency and structure of this mass for each stage of the reaction.

The process in which an apparatus is used which rotates about its axis which is inclined to the horizontal.

The process in which the reaction is effected in one or more devices having propellers or helicoidal threads.

Finally, the process in which the apparatus used comprises several stirrers whose form and arrangements are such that they permit the passage only of thin layers of the reaction mass either between the stirrers or between one of the stirrers and the walls of the apparatus.

However, all these apparatuses are of relatively complicated construction and require great care in working on an industrial scale.

It is an object of the invention to provide a simple process for the continuous esterification of cellulose in homogeneous phase.

It is another object of the invention to provide a process for such esterification of cellulose which is capable of being utilised on an industrial scale without overmuch maintenance troubles.

These and other objects which will become apparent hereinafter, are accomplished according to the invention by a process for the esterification of cellulose in homogeneous phase which comprises continuously treating cellulose with esterifying agents by submitting the reaction mixture of the cellulose and the esterifying agents to the action of a cylindrical worm member having interrupted worm threads, subjecting said reaction mixture to both a rotating and reciprocating movement inside a casing having ribs on its inner surface, said casing being equipped with tubes for leading in the reactants, and controlling the temperature of the reaction mixture in said casing.

In order that the invention may be better understood, by way of example, one embodiment of a reactor for carrying out the process of the invention will now be described with reference to the accompanying diagrammatic drawing which represents a cross section through the reactor.

The reactor comprises a casing 1 with an entrance orifice 2 and an exit orifice 3. The casing 1 has internal surface projections in the form of ribs 4 and surrounds cylindrical shaft 5 having an interrupted worm thread formed of separate paddles 6. Underneath the entrance orifice 2 the shaft 5 has one continuous helical screw thread 13 which terminates at the paddle 6 nearest to it. This shaft receives a rotatory movement and also is axially reciprocable with respect to the casing 1. The casing 1 has jackets 7, 8, 9 and 10 for regulating the temperature. The shaft 5 may be hollow in order to permit circulation of a cooling fluid or heating fluid or may comprise any other means for regulating the temperature in the apparatus. Tubes 11 and 12 are provided for leading reactants to points at which they are required.

For carrying out the process of the invention cellulose, which may or may not have undergone pretreatment for increasing its reactivity, is introduced into the apparatus by the orifice 2. The reactants necessary for effecting esterification are introduced by the orifice 2 and the tubes 11 and 12. By the action of the double movement (rotation and reciprocating) of the shaft 5 the reaction mixture moves through the casing 1 as the reaction proceeds; the reaction mixture is finally expelled through the orifice 3 when the reaction has been carried to the desired stage.

Due to the jackets 7, 8, 9 and 10 which permit heating or cooling the reaction mass, this is maintained at the desired temperature. The speed of displacement of the reaction mass in the interior of the apparatus is regulated by the speed of rotation of the screw and by the reciprocating movement.

The following example illustrates how the embodiment of the apparatus may be used for continuously esterifying cellulose in accordance with the process of the invention, but is not to be held limitative in any way.

Example

Cellulose impregnated with twice its weight of acetic acid is led in continuous fashion at a rate of 150 kg. per hour, the weight being calculated on the dry cellulose, into the entrance orifice 2 of the apparatus. 300 litres per hour of glacial acetic acid are also led into the orifice 2 in continuous fashion. The total quantity of glacial acetic acid used including the quantity of glacial acetic acid employed for mixing in the zone of the apparatus between the hopper 2 and the tube 11 corresponds approximately to four times the dry weight of the cellulose.

A mixture of: | Parts
---|---
Glacial acetic acid | 500
Sulphuric acid (66° Bé.) | 9
Acetic anhydride (97%) | 360 is introduced through tubes 11 and 12 into the apparatus in a continuous fashion and at a rate of 870 litres per hour. Water is circulated in the water jackets so that the temperature of the water is 12° C. in the jacket 7, 20° C. in the jacket 8, 40° C. in the jacket 9 and 55° C. in the jacket 10. The reaction mixture is maintained in the homogeneous phase throughout its passage through the reactor.

The shaft 5 is cooled by circulating in it water at a temperature of 12° C. The duration of the passage of the reaction mixture through the mixing zone comprised between the hopper 2 and the tube 11 is 7 to 15 minutes; the duration of passage in the esterification zone between the tube 11 and the exit orifice 3 is 15 to 20 minutes.

The reaction mixture which leaves by the exit orifice 3 is then directly pumped into a mixing apparatus into which 450 litres per hour of a mixture of 60% acetic acid and 40% of water are also pumped in continuous fashion. In this way a solution of cellulose triacetate in acetic acid is obtained which may be hydrolysed by known means.

The invention has been illustrated by one example showing the manufacture of cellulose acetate but it is also applicable to the preparation of other carboxylic or mixed carboxylic esters of cellulose such as, for example, cellulose propionate, cellulose butyrate and cellulose acetobutyrate.

What we claim and desire to secure by Letters Patent is:

1. A process for the esterification in homogeneous phase of cellulose, which comprises continuously treating cellulose with esterifying agents to produce a reaction mass while advancing the reaction mass through a cylindrical reaction zone in a generally helical path with axial reciprocating movement to cause the mass to advance and retract alternately as it progresses to a discharge point, while regulating the temperature of said reaction mass by heat exchange with a fluid both at the axis of and around the periphery of said cylindrical zone to maintain a uniform temperature throughout the cross section of said mass.

2. A process for the esterification in homogeneous phase of cellulose, which comprises continuously treating cellulose with esterifying agents to produce a reaction mass while advancing the reaction mass through a cylindrical reaction zone in a generally helical path with axial reciprocating movement to cause the mass to advance and retract alternately as it progresses to a discharge point, introducing the esterifying agents at spaced points along said reaction zone, and regulating the temperature of said reaction mass by heat exchange with a fluid both at the axis of and around the periphery of said cylindrical zone to maintain a uniform temperature throughout the cross section of said mass.

References Cited in the file of this patent

UNITED STATES PATENTS

| | | |
|---|---|---|
| 1,870,980 | Altwegg | Aug. 9, 1932 |
| 2,490,643 | Malm | Dec. 6, 1949 |
| 2,505,125 | List | Apr. 25, 1950 |